(12) United States Patent
Davis (10) Patent No.: US 9,372,942 B1
(45) Date of Patent: Jun. 21, 2016

(54) SYSTEM AND METHOD FOR FACILITATING DATA VISUALIZATION VIA A MAP-REDUCE FRAMEWORK

(71) Applicant: Quest Software, Inc., Aliso Viejo, CA (US)

(72) Inventor: Mark William Davis, Tracy, CA (US)

(73) Assignee: Dell Software Inc., Aliso Viejo, CA (US)

( * ) Notice: Subject to any disclaimer, the term of this patent is extended or adjusted under 35 U.S.C. 154(b) by 149 days.

(21) Appl. No.: 13/836,840

(22) Filed: Mar. 15, 2013

(51) Int. Cl.
*G06F 17/30* (2006.01)

(52) U.S. Cl.
CPC ............................ *G06F 17/30991* (2013.01)

(58) Field of Classification Search
CPC ................ G06F 17/30554; G06F 17/30991
USPC ....................................................... 707/722
See application file for complete search history.

(56) References Cited

U.S. PATENT DOCUMENTS

| | | | |
|---|---|---|---|
| 6,820,077 B2 | 11/2004 | Godfredsen et al. | |
| 6,850,947 B1 | 2/2005 | Lim et al. | |
| 7,555,471 B2 | 6/2009 | Hogue et al. | |
| 7,774,791 B1 | 8/2010 | Appelbaum et al. | |
| 7,778,952 B2 | 8/2010 | Vespe et al. | |
| 7,800,613 B2 | 9/2010 | Hanrahan et al. | |
| 7,925,676 B2 | 4/2011 | Hogue et al. | |
| 7,999,809 B2 | 8/2011 | Beers et al. | |
| 8,099,674 B2 | 1/2012 | Mackinlay et al. | |
| 8,140,586 B2 | 3/2012 | Stolte et al. | |
| 8,150,803 B2 | 4/2012 | Hoang et al. | |
| 8,935,232 B2 * | 1/2015 | Abadi ............... | G06F 17/30445 707/713 |
| 2011/0047172 A1 * | 2/2011 | Chen ................. | G06F 17/30445 707/764 |
| 2012/0078951 A1 * | 3/2012 | Hsu .................... | G06F 17/30445 707/769 |
| 2012/0254193 A1 | 10/2012 | Chattopadhyay et al. | |
| 2012/0278323 A1 | 11/2012 | Chattopadhyay et al. | |
| 2013/0024412 A1 | 1/2013 | Gong et al. | |
| 2013/0254196 A1 * | 9/2013 | Babu et al. ..................... | 707/736 |
| 2013/0282650 A1 * | 10/2013 | Zhang ............... | G06F 17/30592 707/605 |
| 2014/0032528 A1 * | 1/2014 | Mandre ............. | G06F 17/30463 707/718 |
| 2014/0032566 A1 * | 1/2014 | Agarwal ........... | G06F 17/30011 707/741 |

OTHER PUBLICATIONS

Fogal Thomas et al., "Large Data Visualization on Distributed Memory Multi-GPU Clusters", The Eurographics Association, 2010, (10 pages).

Nguyen Andrew et al., "HBase, MapReduce, and Integrated Data Visualization for Processing Clinical Signal Data", Computational Physiology-Papers from the AAAI 2011 Spring Symposium (ss-1-04), 2011, pp. 40-44.

(Continued)

*Primary Examiner* — Huawen Peng
(74) *Attorney, Agent, or Firm* — Winstead PC (57) ABSTRACT

In one embodiment, a method includes receiving a request for data visualization. The request specifies input data, at least one user query, and a data-visualization type. The method further includes inferring at least one additional query based on a user-interface (UI) range of freedom associated with the request. In addition, the method includes causing a map-reduce framework to process the input data according to the at least one user query and the at least one additional query. The causing yields resultant data. Further, the method includes storing in a cache a portion of the resultant data that relates to the at least one additional query. The method also includes generating the requested data visualization based on a portion of the resultant data that relates to the at least one user query.

18 Claims, 5 Drawing Sheets

(56) References Cited

OTHER PUBLICATIONS

Vo, Huy et al., "Parallel Visualization on Large Clusters using MapReduce", Oct. 2011, 8 pages.
Leigh, Jason et al., "Visualization of Large-Scale Distributed Data", Jun. 2011, (35 pages).
Wang, Lizhe et al., "MapReduce Across Distributed Clusters for Data-intensive Applications", 2012 (8 pages).
Tableau Software, "Tableau Server Rapid-fire business intelligence. Today", Tableau Server, Mar. 2013, (3 pages).
Informatica, "Informatica Data Services Key Features", Mar. 2013, (2 pages).
Informatica, "Rapid Access to Disparate Data Across Projects Without Rework", Mar. 2013, (2 pages).
Wolfram Mathematica9, "Graphics & Visualization", 2013, (3 pages).
Amazon Web Services, "Amazon Elastic MapReduce (Amazon EMR)", 2013, (7 pages).
Big Data and Mapreduce 2012, The 2012 International Symposium on Big Data and MapReduce (BigDataMR2012), Nov. 2012, (4 pages).

* cited by examiner

SYSTEM AND METHOD FOR FACILITATING DATA VISUALIZATION VIA A MAP-REDUCE FRAMEWORK

BACKGROUND

1. Technical Field

The present invention relates generally to data visualization and more particularly, but not by way of limitation, to systems and methods for data visualization.

2. History Of Related Art

Distributed computing systems that use processing units to work on parts of large-scale computing problems are increasingly common. The amounts of data that are produced by them are also growing in scale, thereby making standard data and information visualization capabilities work inefficiently or not at all when confronted with the scale of the data results.

Approaches for visualizing geospatial relationships and trees have been developed based on the idea of so-called semantic zooming, where a type and form of a visual representation changes depending on an amount of information and/or a granularity of a viewing window. For semantic zooming to work effectively, a user interface must retrieve appropriate data from a remote server incrementally depending on a scale or resolution of the visual representation. This is dependent upon the data being available at multiple scales of resolution, which is not always the case.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, on at least one server computer, receiving a request for data visualization. The request specifies input data, at least one user query, and a data-visualization type. The method further includes inferring, by the at least one server computer, at least one additional query based on a user-interface (UI) range of freedom associated with the request. In addition, the method includes the at least one server computer causing a map-reduce framework to process the input data according to the at least one user query and the at least one additional query. The causing yields resultant data. The method also includes the at least one server computer storing in a cache a portion of the resultant data that relates to the at least one additional query. Additionally, the method includes the at least one server computer generating the requested data visualization based on a portion of the resultant data that relates to the at least one user query.

In one embodiment, an information handling system is operable to perform a method. The method includes receiving a request for data visualization. The request specifies input data, at least one user query, and a data-visualization type. The method further includes inferring at least one additional query based on a user-interface (UI) range of freedom associated with the request. In addition, the method includes causing a map-reduce framework to process the input data according to the at least one user query and the at least one additional query. The causing yields resultant data. Further, the method includes storing in a cache a portion of the resultant data that relates to the at least one additional query. The method also includes generating the requested data visualization based on a portion of the resultant data that relates to the at least one user query.

In one embodiment, a computer-program product includes a computer-usable medium having computer-readable program code embodied therein. The computer-readable program code is adapted to be executed to implement a method. The method includes receiving a request for data visualization. The request specifies input data, at least one user query, and a data-visualization type. The method further includes inferring at least one additional query based on a user-interface (UI) range of freedom associated with the request. In addition, the method includes causing a map-reduce framework to process the input data according to the at least one user query and the at least one additional query. The causing yields resultant data. Further, the method includes storing in a cache a portion of the resultant data that relates to the at least one additional query. The method also includes generating the requested data visualization based on a portion of the resultant data that relates to the at least one user query.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE

Embodiments of the Invention

In various embodiments, computer systems work together to process large collections of data and produce aggregate measures or profiles of the data. In a typical embodiment, a map-reduce framework sends parts of the data to different processing units for processing that can include, for example, counting, outlier detection, collation, extraction of additional metadata from the data, and the like.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

For purposes of this disclosure, the term map-reduce framework refers to a system that is configured to perform: (i) at least one map operation that generates one or more intermediate key/value pairs from input data; and (ii) at least one reduce operation that generates one or more output values from the intermediate key/value pairs. The map-reduce framework typically divides the map operation among multiple program components (sometimes called "workers") and assigns one or more map tasks to each worker. A map-reduce framework divides the reduce operation into reduce tasks and assigns them to workers. In some implementations, the map-reduce framework is run on a cluster of processing devices such as a network of information handling systems. For example, a data center can be established that has racks with tens of thousands of processing modules (e.g., a processing module can be an information handling system, or part thereof), and the map-reduce procedure can be performed as a massive data job distributed among the thousands (or more) processing units. A map-reduce job can involve mapping and reducing several terabytes of data or more, to name just one example.

Figure 1:
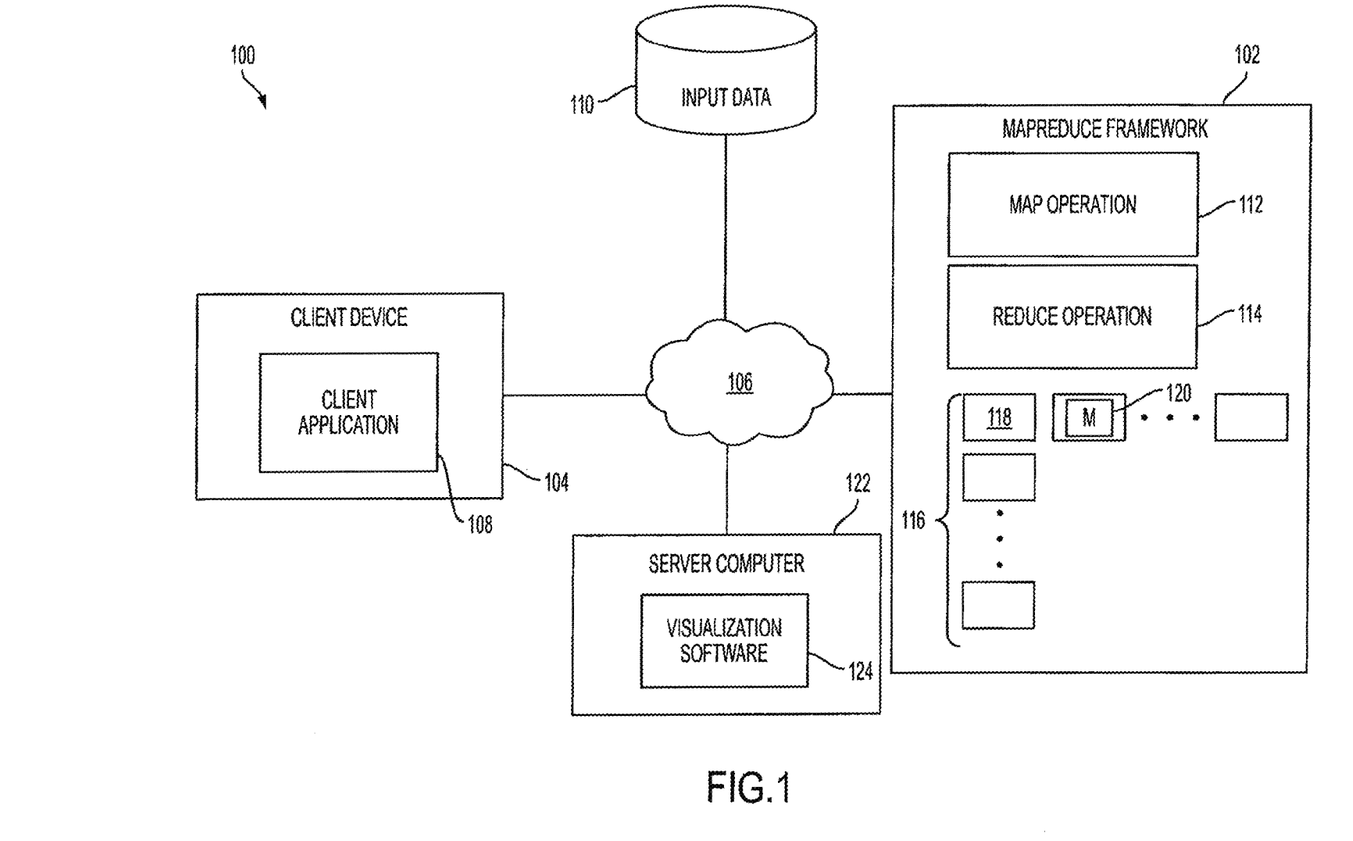
FIG. 1 illustrates an example of a system for performing data visualization.

FIG. 1 illustrates an example of a system 100 for performing data visualization. The system 100 includes a map-reduce framework 102, a client device 104, and a server computer 122. The client device 104 may be an information handling system such as, for example, a server, desktop computer, laptop computer, tablet computer, mobile device, and the like. The server computer 122 is operable to communicate with the client device 104 and the map-reduce framework 102 over a network 106. The network 106 can include, for example, the Internet, a public or private intranet, a network for mobile devices (e.g., a cellular phone network), and/or other communications networks. The client device 104 has a client application 108 such as, for example, a web browser, executing thereon. The server computer 122 has visualization software 124 resident and executing thereon. As described in greater detail below, a user can employ the client application 108 to access the visualization software 124 and request a data visualization, for example, of large volumes of data.

In a typical embodiment, the client application 108 is configured to allow the user to specify the request for data visualization. The request for data visualization typically specifies input data 110, at least one user query on the input data 110, and a data-visualization type. The input data 110 is representative of a data source to which the request for visualization is applicable. The input data 110 can include any suitable information that can be processed in the map-reduce framework 102. For example, and without limitation, the input data 110 can correspond to network data, sales data, observational data, scientific data, random data, population data, artistic data, statistical data, and combinations thereof. The input data 110 can have any data format that is suitable for the map-reduce operations, including, but not limited to, a binary data format, a plain text format, a markup-language format (e.g., XML), or an image format. In a typical embodiment, the input data 110 is accessible to the server computer 122 and/or the map-reduce framework 102 over the network 106.

The at least one user query is typically representative of data operations, data relationships, and the like that underlie the requested visualization. In some embodiments, the client application 108 is configured so that the user can formulate the at least one user query (e.g., using Structured Query Language (SQL) or another query language) to be performed on the input data 110. In other embodiments, the at least one user query may be graphically selectable in the client application 108. The visualization type of the request generally specifies how returned data should be graphically presented. The visualization type can include, for example, scatterplots, pie charts, tables, bar charts, geospatial representations, heat map, chord charts, interactive graphs, bubble charts, candlestick charts, stoplight charts, spring graphs, and/or other types of charts, graphs, or manners of displaying data. The visualization type is typically presented on the client application 108 via a visualization interface provided by the visualization software 124.

The visualization software 124 is operable to receive the request for data visualization and, in response thereto, infer at least one additional query on the input data 110 that the user is deemed likely to want in the near future. Thereafter, the visualization software 124 causes the map-reduce framework 102 to process the input data 110 according to the at least one user query and the at least one additional query. In particular, as described with respect to FIG. 2, the visualization software prepares one or more map-reduce jobs that are processed by the map-reduce framework. The processing yields resultant data (i.e., output values). The visualization software 124 generates the requested data visualization based on a portion of the resultant data that relates to the at least one user query. Subsequently, the visualization software can serve the requested visualization to the client application 108 on the visualization interface.

In typical embodiment, the visualization software 124 stores in a cache a portion of the resultant data that relates to the at least one additional query. The cache may be located, for example, on the map-reduce framework 102, on the server computer 122, and/or on the client device 104. In a typical embodiment, the cache allows the visualization software 124 to efficiently handle user modifications to the data visualization. Specifically, when the user modifies the request via the visualization interface, the visualization software 124 may be able serve a modified data visualization by accessing the cache and without having to wait for further processing by the map-reduce framework 102.

Operation of the map-reduce framework 102 will now be described in more detail. The map-reduce framework 102 includes a map operation 112 and a reduce operation 114. In some implementations, the map operation 112 is configured for processing some or all of the input data 110 as instructed by the visualization software 124 and generating at least one intermediate key/value pair therefrom. In some implementations, the reduce operation 114 is configured for processing at least part of the intermediate key/value pair(s) and generating at least one output value therefrom. In general, the map operation 112 can detect the occurrences, in the input data 110, of each of multiple keys, and the reduce operation 114 can sum or otherwise aggregate data from such detections into useful output information (e.g., a table of occurrence frequencies).

The map operation 112 and/or the reduce operation 114 can be performed as tasks distributed to one or more processors. In some implementations, the map-reduce framework 102 includes, or otherwise works in connection with, a cluster 116 of processing units, such as machines 118. For example, each machine 118 can be an information handling system (e.g., a PC) and they can be networked using any suitable communication protocol (e.g., Ethernet). Each of the machines 118 has at least one memory 120, either integrated in the device or communicatively coupled thereto by an appropriate connection (e.g., a system bus). For example, the memory 120 is used in detecting occurrences of keys in the input data 110, and/or in summing data for generating the output information.

In this fashion, an organization can use the client application 108 to visualize volumes of business data. For example, a telecommunications company (such as a wireless service provider) can have hundreds of millions of customers who engage in many transactions with the company (for example, each use of the wireless service can be registered as a transaction). In such situations, the cumulative business data for some period of time (e.g., a week, month or year) can reach a billion records or more. Assuming the request for data visualization requests visualization of such data, the map-reduce procedure can first be used in analyzing the business data, for example to count the number of transactions originating in a specific country, or the number of unsuccessful transactions. In such a situation, the client application 108 identifies the volume of business data to be used (i.e., the input data 110), and defines a criterion or characteristic that is being sought (i.e., as part of the at least one user query). After processing by the map-reduce framework 102, the visualization software 124 is operable to generate and provide to the client application 108 a visualization interface that includes the requested data visualization.

Figure 2:
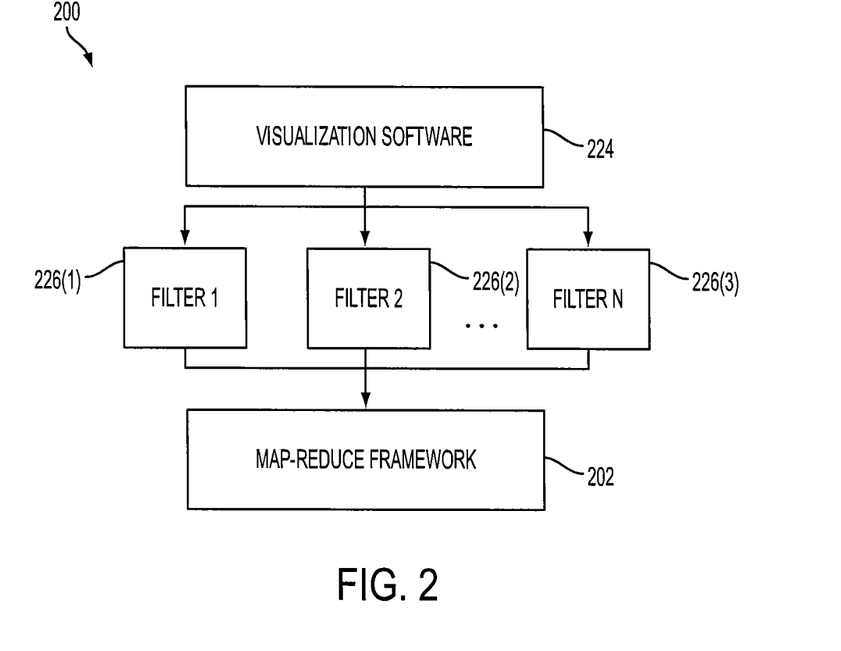
FIG. 2 illustrates an example of how visualization software can interact with a map-reduce framework.

FIG. 2 illustrates an example 200 of how visualization software 224 can interact with a map-reduce framework 202. In a typical embodiment, the visualization software 224 and the map-reduce framework 202 operate as described with respect to the visualization software 124 and the map-reduce framework 202, respectively, of FIG. 2. The visualization software 224 is operable to select, configure, and sequence map-reduce filter 226(1), map-reduce filter 226(2), and map-reduce filter 226(3) (collectively, map-reduce filters 226) based on input data such as, for example, the input data 110, at least one user query, and at least one addition query that is inferred as described with respect to FIG. 1.

The map-reduce filters 226 can be selected, configured, and sequenced based on, for example, types of data in the input data 110 and based on individual data operations required by the at least one user query and the at least one additional query. Each of the one or more map-reduce filters 226 can encompass a single map-reduce job or a composition of map-reduce jobs. In various embodiments, the one or more map-reduce filters 226 may be selected from a library of map-reduce filters. In this manner, the visualization software is operable to prepare one or more map-reduce jobs represented by the map-reduce filters 226. Subsequently, the visualization software 124 causes the map-reduce filters 226 to be applied on the map-reduce framework 202.

Figure 3:
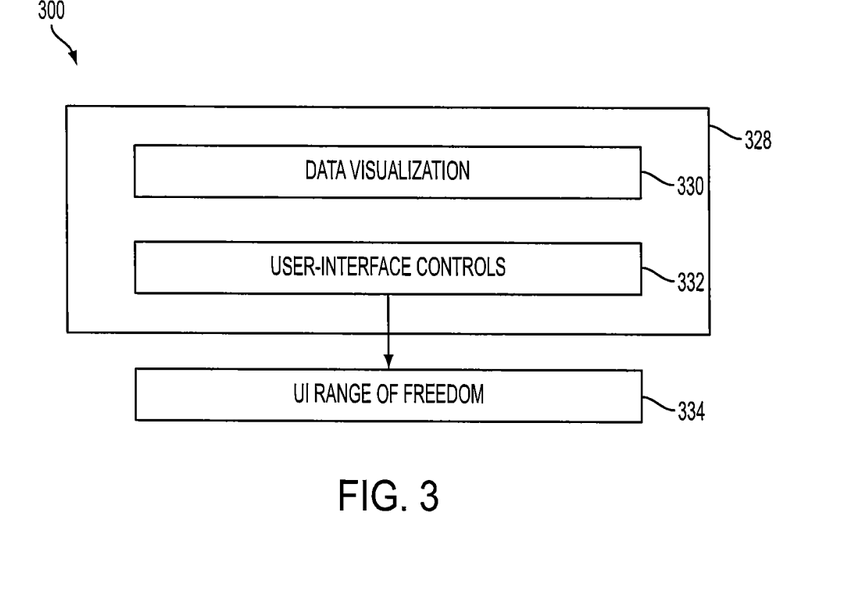
FIG. 3 illustrates an example of a visualization interface.

FIG. 3 illustrates an example 300 of a visualization interface 328. The visualization interface 328 includes a data visualization 330 and a plurality of user-interface (UI) controls 332. The data visualization 330 may be requested and served as described, for example, with respect to FIG. 1. The plurality of UI controls 332 are elements of the visualization interface 328 that are designed to be selectable, modifiable, or otherwise interacted with by a user. The plurality of UI controls 332 can include, for example, buttons, text boxes, sliders, list boxes, menus, menu bars, navigation controls (e.g., links, tabs, and scroll bars), containers (e.g. windows), zooming controls, and other similar GUI elements.

In general, the plurality of UI controls 332 allow the user to modify an original request for the data visualization 330. Modifications may involve supplementing the data visualization 330 with new or different data operations, new or different data relationships, and/or the like. For example, the plurality of UI controls 332 may enable the user to change a level of granularity of the data visualization 330 (i.e., semantic zooming). An example of semantic zooming will be described with respect to FIG. 5.

The UI range of freedom 334 encompasses all modifications to the data visualization 330 collectively enabled by the plurality of UI controls 332. As described above with respect to FIG. 1, the UI range of freedom 334 can serve as the basis for inferring at least one additional query that has not been specified by the user. The at least one additional query can be inferred by identifying each additional data operation and/or data relationship that is included within the UI range of freedom 334. In that way, the at least one additional query is designed to specify additional data that has not yet been requested by the user but may soon be requested via a modification made via the plurality of UI controls 332. In some embodiments, the at least one additional query may be scoped, for example, to include only a subset of the UI range of freedom. For example, in various embodiments, the at least one additional query may be scoped to a smaller set of data operations that are predicted to be more likely based on, for example, a machine-learning model. In addition, depending on available memory and capacity of the map-reduce framework, the at least one additional query may also be scoped according to pre-defined rules and policies.

The visualization interface 328 and, in particular, the data visualization 330, are typically responsive to either a user request or a user modification to an existing request. Therefore, for ease of description, the UI range of freedom 334 may be considered to be associated with either a request or a modification to a request that resulted in the data visualization 330. In various embodiments, the visualization interface 328 may be a pre-packaged interface such that the UI range of freedom 334 is pre-defined. In various other embodiments, the visualization interface 328 may be customized via, for example, UI widgets that provide at least a portion of the plurality of UI controls 332. In these embodiments, the visualization software typically analyzes the plurality of UI controls in order to dynamically ascertain the UI range of freedom 334.

Figure 4A:
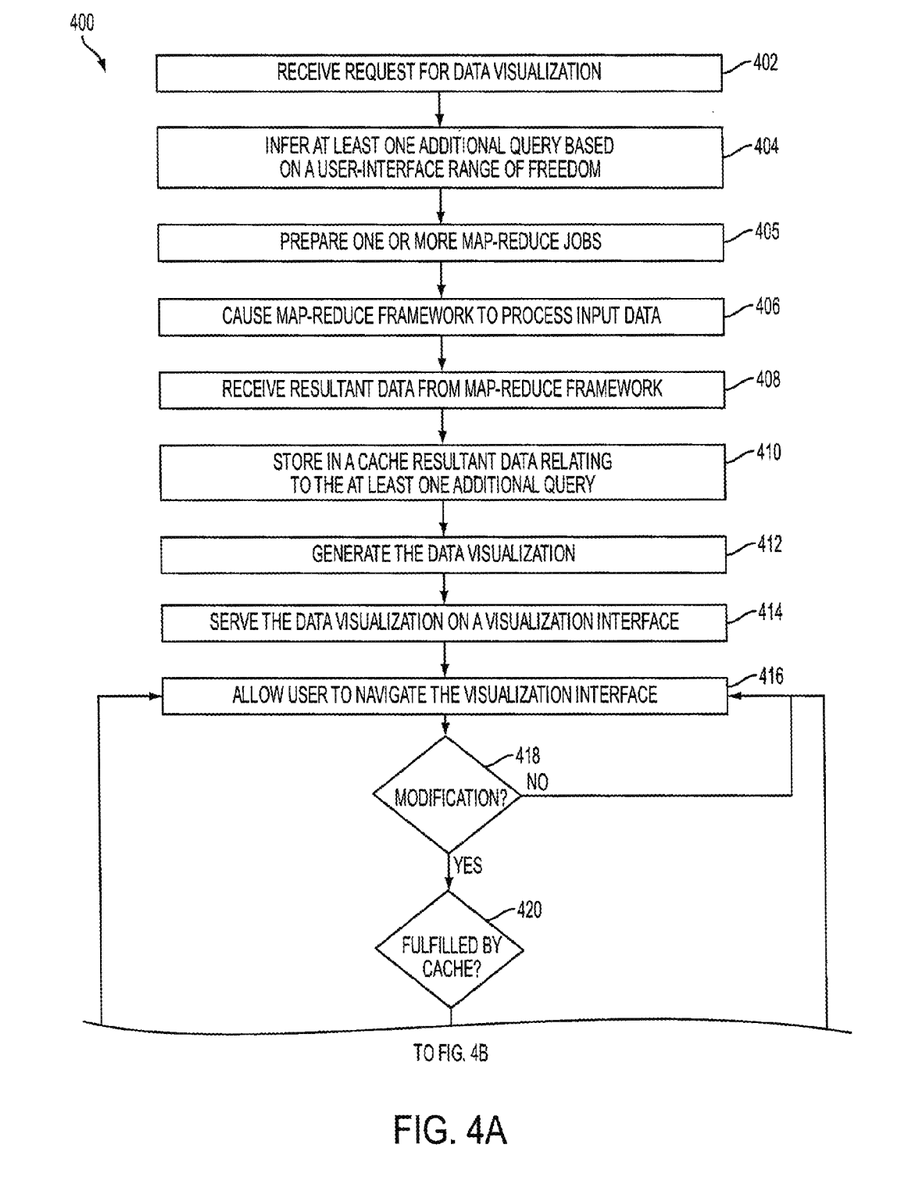
FIG. 4 illustrates a process that may be implemented via visualization software loaded and executing on a server computer.
Figure 4B:
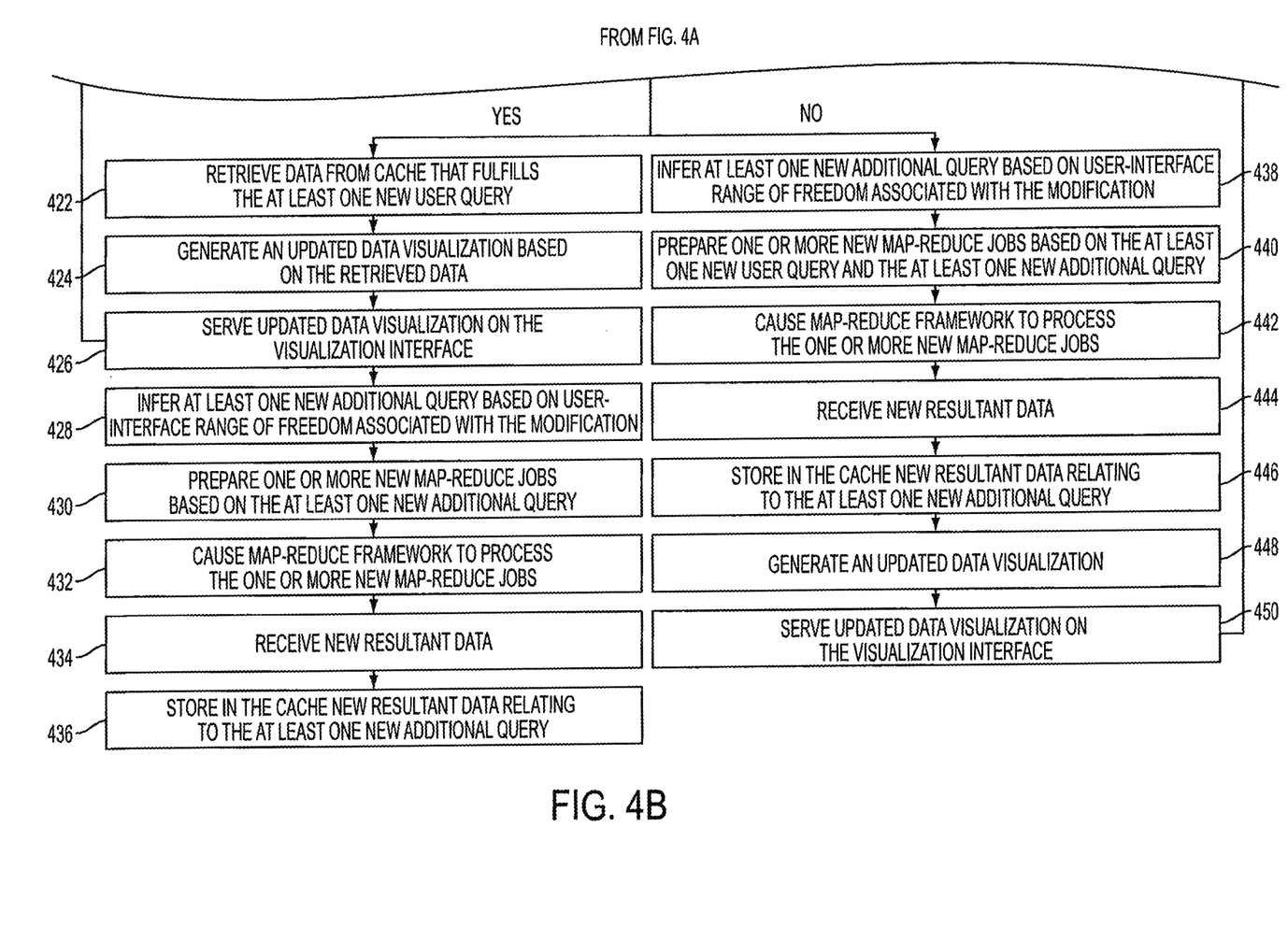

FIG. 4 illustrates a process 400 that may be implemented via visualization software loaded and executing on a server computer. The server computer may be similar to the server computer 122 of FIG. 1. The visualization software may be similar to the visualization software 124 of FIG. 1 and the visualization software 224 of FIG. 2. The process 400 begins at step 402.

At step 402, the visualization software receives a request for data visualization from a user. The request for data visualization typically specifies input data such as, for example, the input data 110 of FIG. 1, at least one user query on the input data, and a data-visualization type. From step 402, the process 400 proceeds to step 404. At step 404, the visualization software infers at least one additional query based on a UI range of freedom associated with the request. In a typical embodiment, the UI range of freedom corresponds to all modifications to the request that will be enabled by a visualization interface provided in response to the request. The at least one additional query may be inferred as described with respect to FIG. 3. From step 404, the process 400 proceeds to step 405.

At step 405, the visualization software prepares one or more map-reduce jobs based on the input data, the at least one user query, and the least one additional query. In various embodiments, the one or more map-reduce jobs may be prepared as described with respect to FIG. 2. From step 405, the process 400 proceeds to step 406. At step 406, the visualization software causes a map-reduce framework such as, for example, the map-reduce framework 102 of FIG. 1 or the map-reduce framework 202 of FIG. 2, to process the one or more map-reduce jobs as described with respect to FIGS. 1-2. From step 406, the process 400 proceeds to step 408. At step 408, the visualization software receives resultant data from the map-reduce framework. The resultant data generally includes data responsive to the at least one user query and the at least one additional query. From step 408, the process 400 proceeds to step 410.

At step 410, the visualization software stores in a cache a portion of the resultant data that is responsive to the at least one additional query. As described with respect to FIG. 1, the cache may be located on the server computer, on the map-reduce framework, or on a client device operated by the user. From step 410, the process 400 proceeds to step 412. At step 412, the visualization software generates the data visualization based on a portion of the resultant data that is responsive to the at least one user query. From step 412, the process 400 proceeds to step 414.

At step 414, the visualization software serves the data visualization on a visualization interface that affords the UI range of freedom. For example, the visualization interface may be served to a client device such as, for example, the client device 104 of FIG. 1, so that the visualization interface can be presented on a client application such as, for example, the client application 108 of FIG. 1. From step 414, the process 400 proceeds to step 416. At step 416, the visualization software allows the user to navigate the visualization interface via a plurality of UI controls provided thereon. From step 416, the process 400 proceeds to step 418.

At step 418, the visualization software determines whether a modification to the request has been made by the user via the visualization interface. If not, the process 400 returns to step 416 and proceeds as described above. If it is determined at step 418 that a modification to the request has been made, the process 400 proceeds to step 420. The modification typically specifies at least one new user query. At step 420, the visualization software determines whether the modification can be fulfilled by the cache. If it is determined at step 420 that the modification can be fulfilled by the cache, the process 400 proceeds to step 422.

At step 422, the visualization software retrieves data from the cache that fulfills the at least one new user query. From step 422, the process 400 proceeds to step 424. At step 424, the visualization software generates an updated data visualization based on the retrieved data. From step 424, the process 400 proceeds to step 426. At step 426, the visualization software serves the updated data visualization on the visualization interface to the client device 104. From step 426, the process 400 returns to step 416 and, in parallel, performs steps 428-436 as described below. At step 428, the visualization software infers at least one new additional query based on a UI range of freedom associated with the modification. In a typical embodiment, the at least one new additional query may be inferred as described with respect to step 404. From step 428, the process 400 proceeds to step 430.

At step 430, the visualization software prepares one or more new map-reduce jobs based on the at least one new additional query. From step 430, the process 400 proceeds to step 432. At step 432, the visualization software causes the map-reduce framework to process the one or more new map-reduce jobs. From step 432, the process 400 proceeds to step 434. At step 434, the visualization software receives new resultant data from the map-reduce framework. From step 434, the process 400 proceeds to step 436. At step 436, the visualization software stores in the cache the new resultant data, which data relates to the at least one new additional query inferred at step 428.

If it is determined at step 420 that the modification cannot be fulfilled by the cache, the process 400 proceeds to step 438. At step 438, the visualization software infers at least one new additional query based on the UI range of freedom associated with the modification as described with respect to 428. From step 438, the process 400 proceeds to step 440. At step 440, the visualization software prepares one or more new map-reduce jobs based on the at least one new user query and the at least one new additional query. From step 440, the process 400 proceeds to step 442. At step 442, the visualization software causes the map-reduce framework to process the one or more new map-reduce jobs. From step 442, the process 400 proceeds to step 444.

At step 444, the visualization software receives new resultant data from the map-reduce framework. From step 444, the process 400 proceeds to step 446. At step 446, the visualization software stores in the cache a portion of the new resultant data that is responsive to the at least one new additional query. From step 446, the process 400 proceeds to step 448. At step 448, the visualization software generates an updated data visualization based on a portion of the new resultant data that is responsive to the at least one new user query. From step 448, the process 400 proceeds to step 450. At step 450, the visualization software serves the updated data visualization on the visualization interface to the client device. In a typical embodiment, the process 400 continues until the ends a visualization session on the client application.

Figure 5:
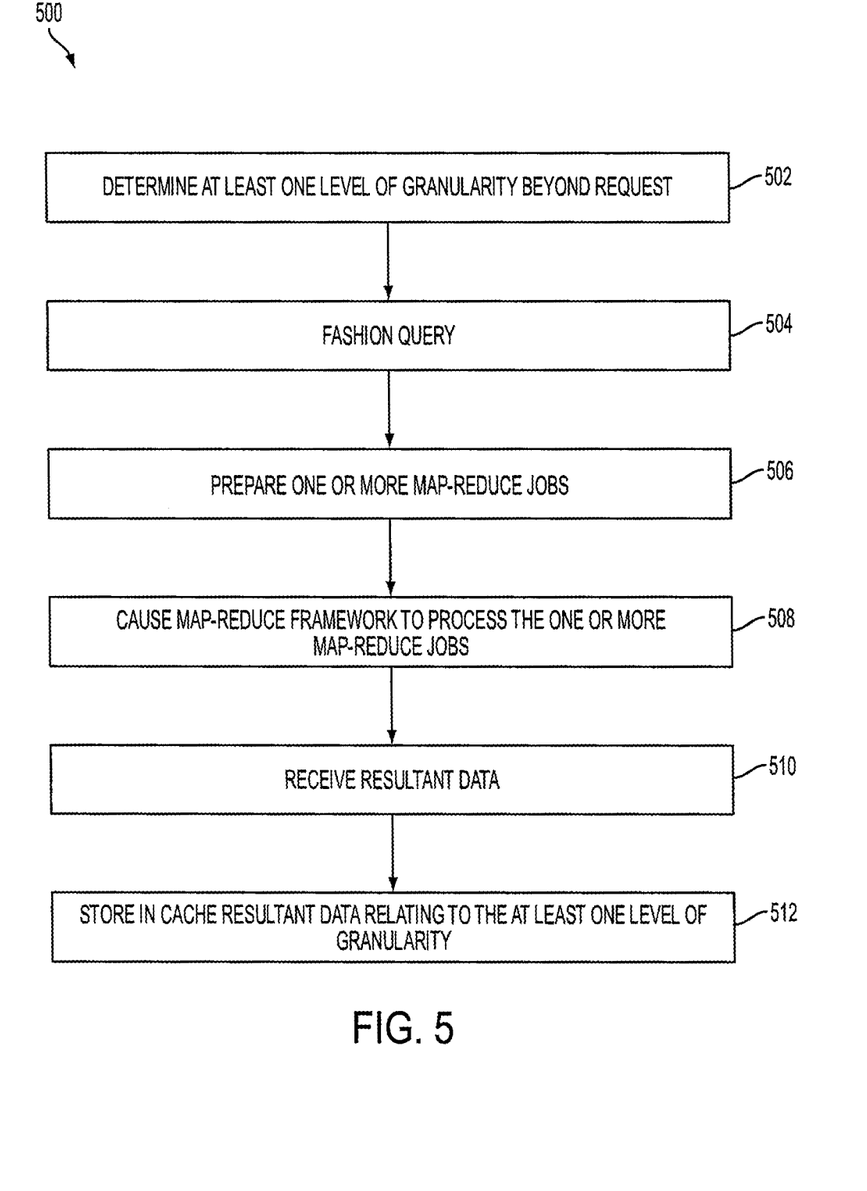
FIG. 5 illustrates a process for semantic zooming.

FIG. 5 illustrates a process 500 for semantic zooming. In various embodiments, the process 500 may be performed, for example, as all or part of steps 404-410, 428-436, and/or steps 438-446 of FIG. 4. It should be appreciated that semantic zooming and, more particularly, the process 400, is a specific example of a class of modifications that a user may be allowed to make on a visualization interface. In typical embodiment, the process 500 is implemented via visualization software such as, for example, the visualization software 124 of FIG. 1 or the visualization software 224 of FIG. 2. The visualization software is typically loaded and executing on a server computer such as, for example, the server computer 122 of FIG. 1. The process 500 begins at step 502.

At step 502, the visualization software determines at least one level of granularity that is beyond what was specified in a user request for data visualization. The at least one level of granularity may be either a level of greater specificity or a level of lesser specificity. Stated somewhat differently, the at least one level of granularity may drill down on (i.e., zoom-in on) the data visualization to include greater specificity or, alternatively, may drill up on (i.e. zoom-out on) the data visualization to provide a higher-level view.

In various embodiments, the at least one level of granularity may include one or more zoom-in next steps and/or one or more zoom-out next steps. The zoom-in next steps typically include next levels of greater specificity supported by the visualization software for a set of input data. The zoom-out next steps typically include next levels of less specificity supported by the visualization software for the set of input data. In some embodiments, the zoom-in next steps and the zoom-out next steps may be pre-configured based on data types included in the set of input data and/or data operations involved. In various other embodiments, determining the at least one level of granularity may involve an analysis of zooming velocity by the user. For example, if the user repeatedly zooms-in on the set of input data within a short period of time, the visualization software can infer that much greater granularity is necessary and specify the at least one level of granularity accordingly. From step 502, the process 500 proceeds to step 504.

At step 504, the visualization software fashions at least one query based on the at least one level of granularity. From step 504, the process 500 proceeds to step 506. At step 506, the visualization software prepares one or more map-reduce jobs based on the at least one query. From step 506, the process 500 proceeds to step 508. At step 508, the visualization software causes a map-reduce framework such as, for example, the map-reduce framework 102 of FIG. 1 or the map-reduce framework 202 of FIG. 2, to process the one or more map-reduce jobs. From step 508, the process 500 proceeds to step 510. At step 510, the visualization software receives resultant data from the map-reduce framework. From step 510, the process 500 proceeds to step 512. At step 512, the visualization software stores in a cache the resultant data. After step 512, the process 500 ends.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
on at least one server computer, receiving a request for data visualization;
wherein the request specifies input data, at least one user query, and a data-visualization type;
inferring, by the at least one server computer without user-modification of the request, at least one additional query not specified by the at least one user query based on a user-interface (UI) range of freedom associated with the request, wherein the UI range of freedom encompasses a plurality of modifications collectively enabled by a plurality of UI controls of a visualization interface on which the requested visualization will be served;
the at least one server computer causing a map-reduce framework to process the input data according to the at least one user query and the at least one additional query, the causing yielding resultant data;
the at least one server computer storing in a cache a portion of the resultant data that relates to the at least one additional query;
the at least one server computer generating the requested data visualization based on a portion of the resultant data that relates to the at least one user query; and
serving the requested visualization on the visualization interface.

2. The method of claim 1, comprising, prior to the causing:
configuring one or more map-reduce filters based on the input data, the at least one user query, and the at least one additional query; and
sequencing the one or more map-reduce filters.

3. The method of claim 2, wherein the causing comprises applying the one or more map-reduce filters on the map-reduce framework.

4. The method of claim 1, wherein the UI range of freedom comprises semantic zooming on the data visualization.

5. The method of claim 4, wherein the inferring comprises:
determining at least one level of granularity beyond the request; and
fashioning at least one query at the at least one level.

6. The method of claim 1, wherein:
the UI range of freedom comprises at least one additional data operation; and
fashioning at least one query related to the at least one additional data operation.

7. The method of claim 1, wherein:
the UI range of freedom comprises at least one additional data relationship; and
fashioning at least one query related to the at least one additional data relationship.

8. The method of claim 1, comprising, as a modification to the request is received via the visualization interface:
determining whether the cache fulfills at least one new user query specified by the modification; and
responsive to a determination that the cache fulfills the at least one new user query:
retrieving data from the cache that fulfills the at least one new user query;
generating an updated data visualization based on the retrieved data; and
serving the updated data visualization on the visualization interface.

9. The method of claim 8, comprising, as the modification to the request is received via the visualization interface:
inferring at least one new additional query based on a user-interface (UI) range of freedom associated with the modification;
causing the map-reduce framework to perform additional processing of the input data according to the at least one new additional query, the additional processing yielding new resultant data relating to the at least one new additional query; and
generating an updated data visualization based on the new resultant data relating to the at least one new additional query.

10. The method of claim 9, comprising:
wherein, responsive to a determination that the cache does not fulfill the at least one new user query, the additional processing comprises additional processing of the input data according to the at least one new user query, the causing to perform additional processing yielding new resultant data relating to the at least one new user query; and
generating an updated data visualization based on the new resultant data relating to the at least one new user query.

11. The method of claim 1, wherein the inferring comprises analyzing the UI range of freedom.

12. The method of claim 1, wherein the data-visualization type is selected from the group consisting of: a scatterplot, a pie chart, a table, a bar chart, a geospatial representation, a heat map, a chord chart, an interactive graph, a bubble chart, a candlestick chart, a stoplight chart, and a spring graph.

13. An information handling system, comprising:
at least one processor, wherein the at least one processor is operable to perform a method comprising:
receiving a request for data visualization;
wherein the request specifies input data, at least one user query, and a data-visualization type;
inferring, without user-modification of the request, at least one additional query not specified by the at least one user query based on a user-interface (UI) range of freedom associated with the request, wherein the UI range of freedom encompasses a plurality of modifications collectively enabled by a plurality of UI controls of a visualization interface on which the requested visualization will be served;

causing a map-reduce framework to process the input data according to the at least one user query and the at least one additional query, the causing yielding resultant data;

storing in a cache a portion of the resultant data that relates to the at least one additional query;

generating the requested data visualization based on a portion of the resultant data that relates to the at least one user query; and serving the requested visualization on the visualization interface.

14. The information handling system of claim 13, comprising:

wherein the UI range of freedom comprises semantic zooming on the data visualization; and wherein the inferring comprises:
determining at least one level of granularity beyond the request; and
fashioning at least one query at the at least one level.

15. The information handling system of claim 13, wherein the method comprises, as a modification to the request is received via the visualization interface:

determining whether the cache fulfills at least one new user query specified by the modification; and responsive to a determination that the cache fulfills the at least one new user query:
retrieving data from the cache that fulfills the at least one new user query;
generating an updated data visualization based on the retrieved data; and
serving the updated data visualization on the visualization interface.

16. The information handling system of claim 15, wherein the method comprises, as the modification to the request is received via the visualization interface:

inferring at least one new additional query based on a user-interface (UI) range of freedom associated with the modification;

causing the map-reduce framework to perform additional processing of the input data according to the at least one new additional query, the additional processing yielding new resultant data relating to the at least one new additional query; and generating an updated data visualization based on the new resultant data relating to the at least one new additional query.

17. The information handling system of claim 16, comprising:

wherein, responsive to a determination that the cache does not fulfill the at least one new user query, the additional processing comprises additional processing of the input data according to the at least one new user query, the causing to perform additional processing yielding new resultant data relating to the at least one new user query; and wherein the method comprises generating an updated data visualization based on the new resultant data relating to the at least one new user query.

18. A computer-program product comprising a non-transitory computer-usable medium having computer-readable program code embodied therein, the computer-readable program code adapted to be executed to implement a method comprising:

receiving a request for data visualization;

wherein the request specifies input data, at least one user query, and a data-visualization type;

inferring, without user-modification of the request, at least one additional query not specified by the at least one user query based on a user-interface (UI) range of freedom associated with the request, wherein the UI range of freedom encompasses a plurality of modifications collectively enabled by a plurality of UI controls of a visualization interface on which the requested visualization will be served;

causing a map-reduce framework to process the input data according to the at least one user query and the at least one additional query, the causing yielding resultant data;

storing in a cache a portion of the resultant data that relates to the at least one additional query;

generating the requested data visualization based on a portion of the resultant data that relates to the at least one user query; and serving the requested visualization on the visualization interface.

* * * * *